(12) United States Patent
Kim

(10) Patent No.: US 12,725,500 B2
(45) Date of Patent: Sep. 1, 2026

(54) BATTERY PACK FIRE DETECTION SYSTEM FOR ELECTRIC MOBILITY

(71) Applicant: KB Global Media Co., Ltd., Yangju-si (KR)

(72) Inventor: Yeong Chan Kim, Dongducheon-si (KR)

(73) Assignee: KB Global Media Co., Ltd., Yangju-si (KR)

( * ) Notice: Subject to any disclaimer, the term of this patent is extended or adjusted under 35 U.S.C. 154(b) by 0 days.

(21) Appl. No.: 19/256,196

(22) Filed: Jul. 1, 2025

(65) Prior Publication Data

US 2026/0065764 A1 Mar. 5, 2026

(30) Foreign Application Priority Data

Sep. 5, 2024 (KR) ........................ 10-2024-0120897

(51) Int. Cl.

| | |
|---|---|
| ***G08B 17/12*** | (2006.01) |
| ***B60L 3/00*** | (2019.01) |
| ***G06T 7/00*** | (2017.01) |
| ***H01M 10/48*** | (2006.01) |
| ***H04N 7/18*** | (2006.01) |

(Continued)

(52) U.S. Cl.

CPC .......... *G08B 17/125* (2013.01); *B60L 3/0046* (2013.01); *G06T 7/0002* (2013.01); *H01M 10/486* (2013.01); *H04N 7/185* (2013.01); *H04N 23/695* (2023.01); *G06T 2207/30232* (2013.01); *G06T 2207/30248* (2013.01); *H04N 23/90* (2023.01)

(58) Field of Classification Search

CPC ... G08B 17/125; B60L 3/0046; G06T 7/0002; G06T 2207/30232; G06T 2207/30248; H01M 10/486; H01M 10/48; H01M 2220/20; H04N 7/185; H04N 23/695; H04N 23/90; Y02E 60/10

See application file for complete search history.

(56) References Cited

U.S. PATENT DOCUMENTS

2026/0009859 A1* 1/2026 Kim .................... G01R 31/389

FOREIGN PATENT DOCUMENTS

| | | | |
|---|---|---|---|
| KR | 10-2022-0130632 A | | 9/2022 |
| KR | 20220130632 A | * | 9/2022 |

(Continued)

*Primary Examiner* — Shahan Ur Rahaman

(74) *Attorney, Agent, or Firm* — Revolution IP, PLLC

(57) ABSTRACT

A battery pack fire detection system includes a temperature sensor installed inside or outside the battery pack to measure an internal temperature of the battery pack, an abnormality determination unit configured to receive collected data collected through the temperature sensor and an imaging units and compare the collected data with a prestored reference value, a storage unit configured to receive and store the collected data collected through the temperature sensor and the imaging units and a detection result of the abnormality determination unit, and a transmission unit configured to, when it is identified that the battery pack is abnormal as the detection result of the abnormality determination unit, transmit an alarm regarding an abnormality or normality and a captured video and image to a prestored user terminal, control center, and emergency rescue organization and transmit an abnormality signal to a control panel of the electric mobility.

3 Claims, 3 Drawing Sheets

(51) Int. Cl.
*H04N 23/695* (2023.01)
*H04N 23/90* (2023.01)

(56) References Cited

FOREIGN PATENT DOCUMENTS

| | | | | |
|---|---|---|---|---|
| KR | 10-2023-0165962 | A | | 12/2023 |
| KR | 20230165962 | A | * | 12/2023 |
| KR | 10-2024-0054545 | A | | 4/2024 |
| KR | 20240054545 | A | * | 4/2024 |
| KR | 10-2024-0058239 | A | | 5/2024 |

* cited by examiner

BATTERY PACK FIRE DETECTION SYSTEM FOR ELECTRIC MOBILITY

CROSS-REFERENCE TO RELATED APPLICATION

This application claims priority to and the benefit of Korean Patent Application No. 10-2024-0120897, filed on Sep. 5, 2024, the disclosure of which is incorporated herein by reference in its entirety.

BACKGROUND

1. Field of the Invention

The present invention relates to a battery pack fire detection system for an electric mobility, and more specifically, to a battery pack fire detection system for an electric mobility in which, in a mobility which is a transportation means that uses electricity as power, when a fire precursor or a fire is detected in a battery pack in which electricity is stored as power, the detected fire precursor is transmitted to a user terminal, a control center, and an emergency rescue organization, thereby suppressing the occurrence of a fire and preventing the spread of a fire that has occurred.

2. Discussion of Related Art

In general, electric mobilities are transportation means that use electricity as energy. These transportation means include not only land transportation means such as vehicles, bicycles, and motorcycles, but also water transportation means such as ships. Hybrid vehicles that use both a gasoline engine and an electric motor may also be considered to belong to electric mobilities.

Such an electric mobility mainly includes a battery, a power converter (inverter), and a motor. A battery is a storage device that stores energy, and a power conversion device is a device that converts electric energy of a battery to generate a necessary driving force and uses the electric energy to drive a motor to move an object.

An electric mobility has the advantages of being environmentally friendly, having low noise, and currently being cheaper than fossil fuels such as gasoline, but has the disadvantage that when a battery pack storing energy catches fire due to an external impact, an internal short circuit, or the like, the fire cannot be extinguished until the battery is completely burned. This is because, in order to extinguish a fire that has occurred inside a battery pack, the battery pack should be disassembled or perforated to inject a fire extinguishing agent into the battery pack, but it is impossible to disassemble or perforate the battery pack that is hot due to a fire.

In particular, when a battery cell catches fire, since as the battery cell and surrounding battery cells undergo a chain explosion reaction, a negative electrode active material of the battery cell supplies materials such as carbon, and a positive electrode active material of the battery supplies oxygen, and therefore the fire cannot be extinguished until all the battery cells are burned. Thus, in most cases, an object in which the battery pack is installed is completely burned.

Therefore, in the case of electric mobilities, there is an urgent need for a system capable of identifying whether a battery is abnormal at an early stage, and in particular, there is a need for a system capable of constantly monitoring a battery pack irrespective of whether a vehicle is traveling or parked, detecting a fire precursor such as overheating in real time, and taking prompt follow-up measures.

RELATED ART DOCUMENTS

Patent Documents (Patent Document 1) Korean Laid-open Patent No. 10-2024-0058239 (Published on May 3, 2024).

SUMMARY OF THE INVENTION

The present invention is directed to providing a battery pack fire detection system for an electric mobility in which, in any electric mobility that uses electric energy stored in a battery pack as power, the battery pack is constantly monitored to allow prompt follow-up measures to be taken in the event of an abnormal condition such as overheating, thereby minimizing the occurrence and spread of a fire to reduce loss of life and property damage.

According to an aspect of the present invention, there is provided a battery pack fire detection system for detecting overheating and a temperature abnormality of a battery pack installed in an electric mobility, which includes a temperature sensor installed inside or outside the battery pack to measure an internal temperature of the battery pack, an abnormality determination unit configured to receive collected data collected through the temperature sensor compare the collected data with a prestored reference value to detect whether the battery pack is abnormal, a storage unit configured to receive and store the collected data collected through the temperature sensor and a detection result of the abnormality determination unit, and a transmission unit configured to, when it is identified that the battery pack is abnormal as the detection result of the abnormality determination unit, transmit an alarm regarding an abnormality or normality and a captured video and image to a prestored user terminal, control center, and emergency rescue organization and transmit an abnormality signal to a control panel of the electric mobility.

The battery pack fire detection system may further include one or more imaging units installed to photograph an exterior of the battery pack, and the abnormality determination unit may receive data collected by one or more imaging cameras installed to photograph the exterior or interior of the electric mobility and may compare the data with the prestored reference value to detect whether a fire has occurred.

The temperature sensor may be provided as one or more temperature sensors installed at positions spaced apart from each other to detect temperatures of different areas or different components inside the battery pack.

When it is determined that a calculated value obtained by comparing the collected data collected through any one imaging unit of the one or more imaging units with the prestored reference value indicates a fire precursor, the abnormality determination unit may move other imaging units other than the imaging unit to a position at which an area in which the fire precursor is determined is to be photographed, through a displacement module, and may receive videos or images captured by the moved imaging units to perform cross-verification on the fire precursor of the area.

The displacement module may include a winding unit in which pairs of winding rollers are disposed to be spaced apart from each other at two sides, and a pair of winding rollers are disposed at two sides to face each other, a pair of wires which extend in a longitudinal direction and of which one end portions in the longitudinal direction are each drawn out and wound from and on the pair of winding rollers facing each other, a motor configured to move the pair of wires in the same direction by rotating the pair of winding rollers, a moving plate to which the one end portions of the wire are fixed and on which the imaging unit is installed, and a rail which extends in a longitudinal direction, is disposed between the winding rollers disposed at the two sides of the winding unit, and guides a movement path of the moving plate.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

Figure 1:
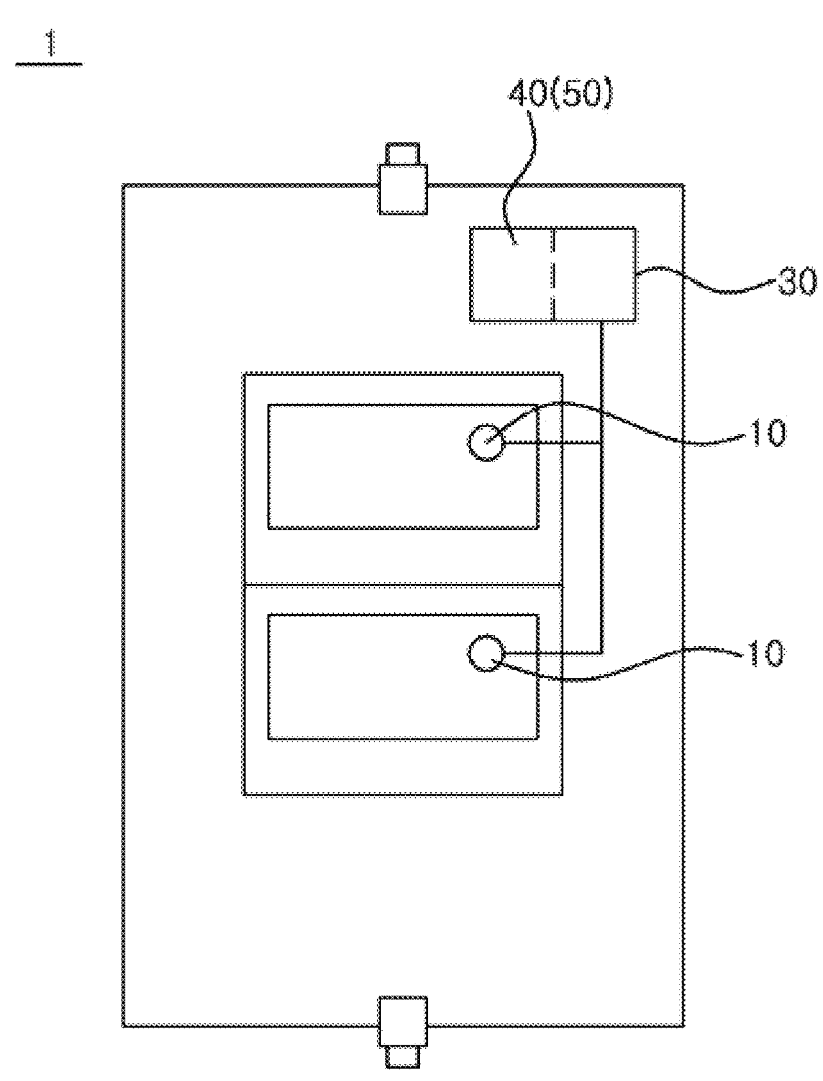
FIG. 1 is an exemplary view illustrating a battery pack fire detection system for an electric mobility according to the present invention.
Figure 2:
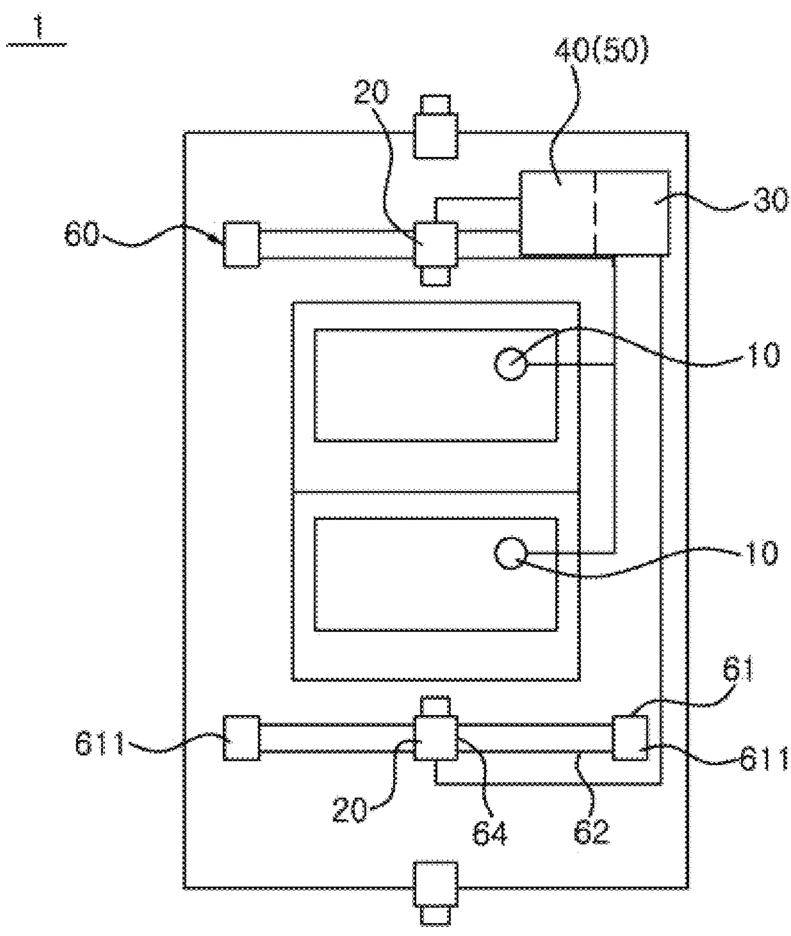
FIG. 2 is an exemplary view illustrating another embodiment of a battery pack fire detection system for an electric mobility according to the present invention.
Figure 3:
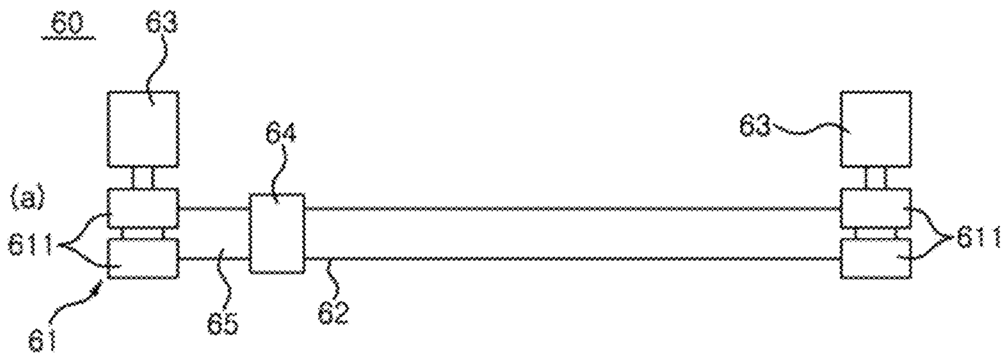
FIG. 3 shows exemplary views illustrating a displacement module constituting the present invention.
Figure 3:
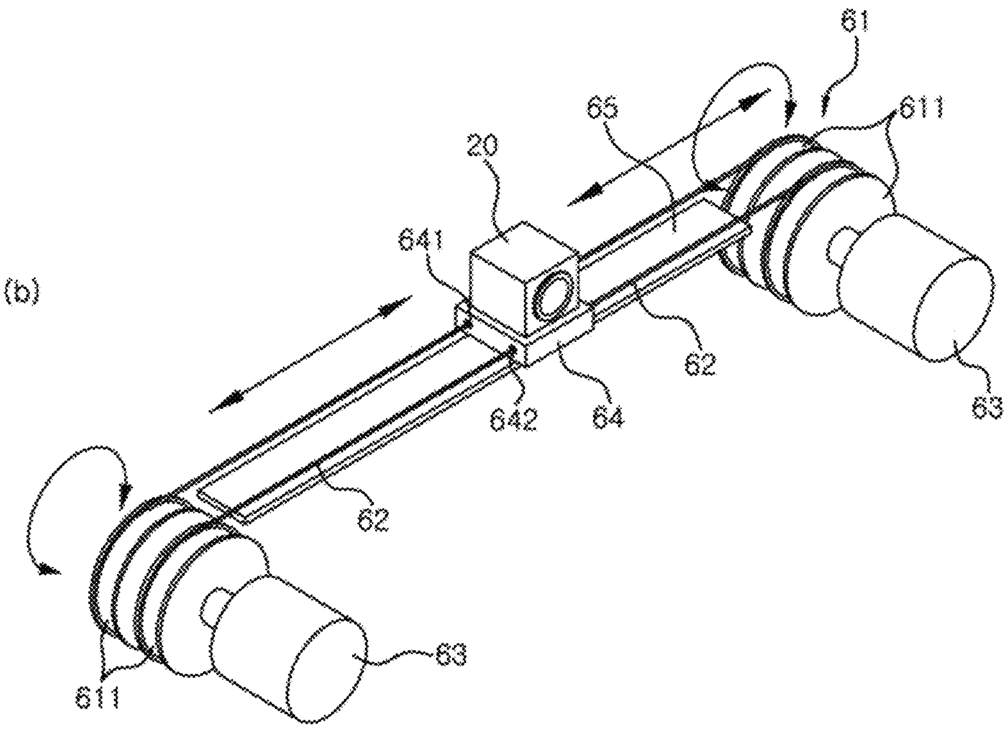

Hereinafter, exemplary embodiments of a battery pack fire detection system for an electric mobility according to the present invention will be described with reference to the accompanying drawings.

Examples of an electric automobile will be described below, but other transportation means using electric energy include bicycles, motorcycles, and ships. Examples of an electric automobile will be described below, but it goes without saying that the description is applicable to all the above-described transportation means, that is, electric mobilities.

First, a battery pack fire detection system 1 for an electric mobility according to the present invention includes a temperature sensor 10 that detects overheating and a temperature abnormality of a battery pack installed in an electric mobility and is installed inside or outside the battery pack to measure an internal temperature of the battery pack, an abnormality determination unit 30 that receives collected data collected through the temperature sensor 10 and an imaging unit 20 to be described below and compares the collected data with a prestored reference value to detect whether the battery pack is abnormal, a storage unit 40 that receives and stores the collected data collected through the temperature sensor 10 and the imaging unit 20 to be described below and a detection result of the abnormality determination unit 30, and a transmission unit 50 that, when it is identified that the battery pack is abnormal as a detection result of the abnormality determination unit 30, transmits an alarm regarding an abnormality or normality and a captured video and image to a prestored user terminal, control center, and emergency rescue organization and transmits an abnormality signal to a control panel of the electric mobility.

The temperature sensor 10 primarily detects overheating of the battery pack to detect whether the battery pack is abnormal and is installed inside or outside of the battery pack, in which a plurality of battery cells are embedded, to measure an internal temperature of the battery cells and the battery pack. The number of installed temperature sensors 10 and an interval therebetween are adjusted according to the size of the battery pack and the number of embedded and installed battery cells.

As an example, as shown in the drawing, when an internal space of the battery pack is arbitrarily divided into two areas, two temperature sensors 10 are installed to detect temperatures of the two divided areas. In this case, an installation position is a position inside or outside the battery pack, and it is preferable that the temperature sensor 10 be installed outside the battery pack. However, of course, the present invention is not limited thereto.

Meanwhile, in addition to the temperature sensor 10, an odor detection sensor (not shown) that captures air particles inside the battery pack and detects odorous materials included in the particles may be additionally disposed.

The odor detection sensor converts chemical information of odor molecules into electrical information. When odor molecules are adsorbed on a surface of the odor detection sensor, electrical conductivity increases, and thus resistance decreases. Such a change in resistance is applied to a bridge circuit of a detection circuit to detect a voltage deviation.

A plurality of odor detection sensors are installed at positions spaced apart from the temperature sensor 10 to detect odors generated in an insulating material constituting the battery pack and detect odors generated due to a temperature rise at an early stage, thereby allowing prompt follow-up measures to be taken.

Meanwhile, in the present invention, in addition to the temperature sensor 10, the imaging unit 20 is further provided to detect whether the battery pack is abnormal. The imaging unit 20 is installed to photograph the exterior of the battery pack, and one or more imaging units 20 are installed to photograph different positions at positions spaced apart from each other outside the battery pack.

Here, the imaging unit 20 may be provided as any one of a general camera capable of capturing a video, an image, or the like and a non-contact measuring thermal imaging camera that detects infrared energy (heat) and converts the infrared energy into a real image.

In the present invention, when the imaging unit 20 is a general camera, a camera of a black box installed in a vehicle may be used. The black box photographs a driving or parking situation of the vehicle in real time and records an image captured when an impact with predetermined intensity or more occurs.

Channels of the black box are classified into 2 to 4 channels according to the number of installed cameras and the positions of the cameras. In the case of 4 channels, the black box includes 4 cameras installed to photograph front, rear, left and right side surfaces of a vehicle and includes a memory card that may store videos captured by the 4 cameras.

In the present invention, when the imaging unit 20 is a general camera, that is, a black box is used, at least one of a lower camera capable of photographing a lower portion of a vehicle at which a battery pack is installed or an interior camera capable of photographing the interior of a vehicle is added to monitor a fire precursor or a fire outbreak in real time.

In addition, when the imaging unit 20 is provided as a thermal imaging camera, the imaging unit 20 detects infrared light, that is, heat, emitted by a battery pack that is a subject, visualizes the infrared light, and then transmits the infrared light to the abnormality determination unit 30 to be described below to monitor a temperature change of the battery pack.

Furthermore, in the present invention, both a general camera and a thermal imaging camera may be applied as the imaging unit 20. When an analysis result of data captured by the thermal imaging camera indicates a fire precursor or a fire outbreak, the general camera is used to photograph an actual situation of a corresponding area, and the transmission unit 50 to be described below transmits a video or an image captured by the general camera to a user terminal, a control center, and an emergency rescue organization, thereby allowing an actual situation to be identified.

That is, using any one or two of a general camera and a thermal imaging camera as the imaging unit 20 has a disadvantage in that, since the unit price of a thermal imaging camera is known to be at least 5 to 10 times the unit price of a general camera, when a plurality of thermal imaging cameras are installed, a unit price of the entire system becomes very high, which reduces economic feasibility.

Accordingly, an image of the exterior of a battery pack is captured in real time using a general camera with a relatively low unit price, and the captured image is compared with a prestored reference value through the abnormality determination unit 30 to be described below to diagnose a fire precursor or a fire outbreak, thereby providing a fire detection system with a low unit price.

In addition, when a combination of a general camera and a thermal imaging camera is used, a unit price of the entire system increases relatively, but there is an advantage in that accuracy is increased, and thus it is possible to offer systems of various price ranges to consumers, thereby expanding a range of consumer choices.

Meanwhile, one or more imaging units 20 are disposed at positions spaced apart from each other according to the size, shape, or the like of a battery pack to photograph different areas of the battery pack. When thermal energy of the photographed area is found to be higher than a prestored reference value as a result of detecting a video captured by any one imaging unit 20, another imaging unit 20 is moved to a position at which an area of which thermal energy is detected to be higher than the reference value may be photographed, to then operate the imaging unit 20, and a video obtained through the imaging unit 20 is detected and cross-verified, thereby more accurately detecting a fire precursor.

To this end, the imaging unit 20 is installed to be movable by a displacement module 60. The displacement module 60 will be described in detail below.

The abnormality determination unit 30 receives collected data through the temperature sensor 10 and the imaging unit 20 and compares the collected data with a prestored reference value to detect whether the battery pack is abnormal.

The abnormality determination unit 30 includes a receiver that receives collected data from the temperature sensor 10 and the imaging unit 20, a calculator that stores a reference value and compares the collected data received from the receiver with a stored reference value to detect whether the collected data is abnormal, and a transmitter that transmits a result calculated by the calculator to each of the storage unit 40 and the transmission unit 50 to be described below.

The calculator constituting the abnormality determination unit 30 receives collected data collected through the temperature sensor 10 and the imaging unit 20 and compares the collected data with a prestored reference value to detect whether an abnormality has occurred. In such a process, artificial intelligence (AI) is used for diagnosing the collected data, determining subsequent processing according to a diagnosis value, or the like to provide a fast processing speed and high accuracy.

In addition, the AI of the abnormality determination unit 30 may provide a fast processing speed and high accuracy through "machine learning" through which data is learned to find rules by itself and may be configured to learn collected data transmitted from the temperature sensor 10 and the imaging unit 20 and a diagnosis value obtained by comparing the collected data with a reference value.

The storage unit 40 stores a result value detected through the abnormality determination unit 30, and in this case, also stores collected data collected through the temperature sensor 10 and the imaging unit 20.

That is, the storage unit 40 stores a diagnosis value obtained by comparing collected data of the temperature sensor 10 and the imaging unit 20 with a reference value and stores collected data of the temperature sensor and the imaging unit in conjunction with each other when storing the collected data, wherein the collected data is an input value of the diagnosis value.

The storage unit 40 may provide stored data when the abnormality determination unit 30 requests the stored data and may transmit the stored data to an external device. Here, the external device may be a computer, a tablet, a smartphone, a tablet personal computer (PC), or the like connected through a wired cable or a wireless communication component and may be a directly accessible removable memory card.

In addition, the storage unit 40 may be configured to automatically arrange stored data to use limited capacity, and for example, the oldest data in a storage list among stored data may be sequentially deleted to secure internal capacity.

Meanwhile, the storage unit 40 may be provided as a digital video recorder (DVR) to store data by converting the stored data into a digital form and may further include software that may store the stored data on a digital disk or may allow the stored data to be used on a separate set-top box or PC.

When it is identified that the battery pack is abnormal as a detection result of the abnormality determination unit 30, the transmission unit 50 transmits a text message to a prestored user terminal, control center, and emergency rescue organization and transmits an abnormality signal to the control panel of the electric mobility.

Here, the transmission unit 50 includes a communication module to transmit an alarm signal regarding an abnormality or normality to a prestored user terminal, control center, and emergency rescue organization. Text for providing a notification of an emergency situation may be stored in the communication module. The stored text is transmitted to a user terminal and an emergency rescue organization such as a fire station or a police station, and an alarm signal regarding an abnormality or normality and a captured video and image are transmitted to a control center.

Here, the control center is managed by a service provider that provides the fire detection system according to the present invention. After receiving the fire alarm signal transmitted through the transmission unit 50, the control center analyzes a transmission position of the fire alarm signal and system identification information included in the fire alarm signal and transmits a text message regarding a fire precursor, a fire outbreak, or the like to a terminal of a consumer using a corresponding system and an emergency rescue organization and performs reporting.

That is, the control center receives an alarm signal from the transmission unit 50 regarding an abnormality or normality such as a fire precursor or a fire outbreak in an electric vehicle, analyzes position information and a system identification number included in the received alarm signal, verifies user information of a corresponding system, and then transmits a text message regarding a fire precursor to a user terminal and an emergency rescue organization.

When a text message regarding a fire precursor or a fire outbreak is transmitted to a user terminal or an emergency rescue organization through the transmission unit 50, a transmission time may be delayed according to a communication state, and the text message may not be transmitted. That is, since text is transmitted as a text message, a communication module itself for transmitting a text message is complex and relatively expensive.

On the other hand, a signal transmitted to a control center includes only relatively brief information and thus is able to be transmitted and received even at relatively low signal intensity. Accordingly, there is an advantage in that a signal may be received even from the transmission unit 50 installed in a vehicle parked in an underground parking lot.

In addition, when the transmission unit 50 transmits a text message to a user terminal, a control center, and an emergency rescue organization, when the imaging unit 20 includes a general camera, a video or image captured by the general camera is transmitted to the user terminal, the control center, and the emergency rescue organization.

In particular, in a communication situation in which the transmission unit 50 and the control center can transmit or receive a text message, a video or image captured by the imaging unit 20 is transmitted to the control center to verify whether a diagnosis value detected by the abnormality determination unit 30 has an error.

That is, the control center verifies the error of the diagnosis value detected by the abnormality determination unit 30. When the abnormality determination unit detects a diagnosis value for a fire precursor or a fire outbreak, the control center verifies whether the diagnosis value has an error through a video or image transmitted to the control center, and when a result matches the diagnosis value, the control center reports the fire precursor or fire outbreak to the emergency rescue organization.

To describe this again, when a diagnosis value of the abnormality determination unit 30 indicates a fire precursor or a fire outbreak, the transmission unit 50 first transmits a text message and a fire alarm to a user terminal and a control center, and the control center analyzes a video or image of a corresponding area captured through another general camera to verify whether the diagnosis value has an error. When a verified result matches the diagnosis value, the control center reports the fire precursor or fire outbreak to the emergency rescue organization, thereby preventing unnecessary dispatches due to errors.

In addition, an alarm signal regarding an abnormality or normality is transmitted to a user terminal to allow follow-up measures to be taken. A user receiving an alarm signal of a diagnosis value regarding a fire precursor in a state in which a vehicle is parked in an underground parking lot of a multihouse is allowed to move the vehicle to the ground or a designated evacuation position, thereby preventing massive property damage in the event of a fire in the underground parking lot.

To this end, it is preferable that an alarm signal transmitted to a user terminal be repeatedly transmitted multiple times with a predetermined time difference. An alarm sound or vibrations are externally displayed along with a signal through a user terminal.

Meanwhile, in the present invention, a user terminal may be a fixed terminal or a mobile terminal implemented as a computing device, for example, a computer, a laptop computer, a tablet PC, a smartphone, a wearable device, or the like. The present invention is not limited to such examples, and the user terminal may be any terminal that may receive a signal from the transmission unit 50 to output the signal on a screen and may include a speaker and a light to have a function of emitting a sound and light to the outside.

In addition, the user terminal may have a function of receiving an alarm signal of the fire detection system according to the present invention from the control center and may download and install an application for performing functions such as authentication and storage.

That is, the fire detection system according to the present invention transmits an alarm signal according to whether the battery pack is abnormal by using an application installed in a user terminal and displays an alarm signal received through the application to the outside of the user terminal. Thus, whether the battery pack is abnormal can be externally identified, thereby allowing prompt follow-up measures to be taken.

In addition, in a state in which a vehicle is traveling, an abnormality signal may be transmitted to a control panel of the vehicle in a form that can be checked by the driver who drives the vehicle. As an example, an icon indicating whether a battery pack is abnormal may be displayed on a center fascia of a vehicle, or an abnormality signal may be emitted through a sound.

In addition, the transmission unit 50 receives position information of a vehicle from a GPS device installed in the vehicle and then provides the position information as well as a text message, thereby minimizing an arrival time after dispatch from an emergency rescue organization such as a fire station or a police station.

That is, by minimizing a time taken from dispatch to arrival, it is possible to extinguish a fire at an early stage, and by minimizing the spread of a fire that has occurred, it is possible to reduce life damage and property damage.

In addition, the transmission unit 50 may be provided in a digital video recorder together with the storage unit 40 and may be provided as a wireless modem provided in the digital video recorder.

The digital video recorder may store relatively large amounts of video or images as compared to a memory card provided in a typical black box installed in a vehicle and may move the stored video or images to a separate storage medium.

According to the present invention as described above, in a mobility that uses electricity as power, a temperature change in a battery pack, which is a power source, is monitored in real time to detect a fire precursor or a fire outbreak at an early stage, thereby minimizing the occurrence and spread of fire. In particular, it is expected to have an effect of minimizing the occurrence of large-scale fire accidents and property damage caused by a fire in an electric vehicle parked in a parking lot of a multihouse such as an apartment.

Meanwhile, the abnormality determination unit 30 receives collected data from one or more imaging unit 20 installed to photograph the exterior or interior of an electric mobility and compares the collected data with a prestored reference value to detect whether a fire has occurred.

As an example, images captured by a front camera, a rear camera, and a side camera installed to photograph the exterior of an electric vehicle and an image captured by an interior camera installed to photograph the interior of a vehicle are each received and compared with a prestored reference value to detect whether an abnormality has occurred.

Here, the prestored reference value may be an image or a video of an external state of an electric vehicle, a video or an image of the interior of an electric vehicle, or a temperature of a position at which a battery is disposed inside an electric vehicle.

Meanwhile, the abnormality determination unit 30 improves the accuracy of detecting whether an abnormality has occurred through cross-verification by changing a position of the imaging unit 20 as described above. To this end, the displacement module 60 for changing the position of the imaging unit 20 is provided.

That is, when it is determined that a calculated value of collected data transmitted from any one imaging unit 20 of the imaging units 20 indicates a fire precursor, the abnormality determination unit 30 moves other imaging units 20 other than the imaging unit 20 to a position in which an area in which a fire precursor is determined may be photographed, through the displacement module 60, and receives videos or images captured by the moved imaging units 20 to perform cross-verification on the fire precursor of the area.

To this end, a position of the imaging unit 20 is moved through the displacement module 60, and the displacement module 60 includes a winding unit 61 in which pairs of winding rollers 611 are disposed to be spaced apart from each other at two sides, and a pair of winding rollers 611 are disposed at two sides to face each other, a pair of wires 62 which extend in a longitudinal direction and of which both end portions in the longitudinal direction are drawn out and wound from and on the pair of winding rollers 611 facing each other, a motor 63 which rotates the pair of winding rollers 611 to move the pair of wires 62 in the same direction; a moving plate 64 which is disposed on the wire 62 and on which the imaging unit 20 is installed, and a rail 65 which extends in a longitudinal direction, is disposed between the winding rollers 611 disposed at two sides of the winding unit 61, and guides a movement path of the moving plate 64.

The winding units 61 are disposed to face each other at positions spaced apart from each other, and pairs of winding rollers 611 are disposed to be spaced apart from each other at two sides and facing each other.

The winding roller 611 winds and draws out the wire 62, and a pair of winding rollers 611 disposed at one side are disposed at positions spaced apart from each other to allow the pair of wires 62 to be positioned at positions spaced apart from each other.

In addition, pairs of winding rollers 611 disposed at two sides are connected to each other through a joint link (not shown) to rotate in conjunction with each other.

The wire 62 extends in the longitudinal direction, one end portion thereof in the longitudinal direction is connected to the moving plate 64 to be described below, and the other end portion thereof in the longitudinal direction is installed to be drawn out and wound from and on either of one pair of winding rollers 611.

In this case, the wire 62 may be replaced with a known general wire or any component that has a predetermined length, and both end portions thereof in a longitudinal direction are drawn out and wound from and on a pair of winding rollers 611. For example, the wire 62 may be changed into a belt, a chain, or the like.

The motor 63 operates under an applied signal and applied power to rotate the pair of winding rollers 611 and is positioned at each of two sides of the winding unit 61.

When any one of a pair of motors 63 disposed as above operates, since the other is idle, the motors 63 do not interfere with the movement of the wire 62.

The imaging unit 20 is installed on an upper surface of the moving plate 64, and the moving plate has a fastening member 642 through which the wire 62 passes to be inserted and which is connected to the inserted wire 62 and moves the moving plate 64 in the same direction as a moving direction of the wire when the wire 62 moves.

The moving plate 64 is formed in the form of a plate with a flat upper surface and has coupling holes 641 to which end portions of the pair of wires 62 are coupled, and the fastening member 642 for fixing the inserted wire 62 is disposed in the coupling hole 641.

The rail 65 extends in the longitudinal direction, both end portions thereof in the longitudinal direction are disposed between the winding rollers 611 at two sides constituting the winding unit 61, and the moving plate 64 is installed on the rail 65 to be movable.

The displacement module 60 formed as described above operates the motor 63 to rotate the winding roller 611 and move the wire 62, and the moving plate 64 to which one end portion of the wire 62 is connected moves according to the movement of the wire 62. In this case, the imaging device 20 is installed on the moving plate 64, and the moving plate 64 moves the imaging device 20 to a desired position.

A measurement result received from the moved imaging device 20 is prepared with a prestored reference value by the abnormality determination unit 30 to cross-verify a diagnosis value for a fire precursor or a fire outbreak in a corresponding area, and a verified value is transmitted to the storage unit 40 and the transmission unit 50.

Meanwhile, the imaging unit 20 and general cameras such as a front camera, a rear camera, a side camera, and an indoor camera for photographing the interior installed in a vehicle may operate in conjunction with each other. As an example, when a measurement result of the imaging unit 20 is diagnosed to indicate a fire precursor or a fire outbreak, the general camera is operated to photograph a fire precursor or fire outbreak area, and a captured image is stored in the storage unit 40 and transmitted to a user terminal, a control center, and an emergency rescue organization at the same time, thereby monitoring a fire precursor or a fire outbreak in real time.

In addition, in the event of a fire, there is an advantage that it is easy to identify the cause because an initial ignition point can be analyzed through a transmitted image.

According to the present invention as described above, in a mobility that uses electricity as power, a temperature change in a battery pack, which is a power source, can be monitored in real time to identify whether the battery pack is abnormal at an early stage, and when an abnormality is detected in a state in which a vehicle is parked, an alarm signal is transmitted to a user terminal, a control center, and an emergency rescue organization to prevent the occurrence of a fire in advance, thereby reducing life damage and property damage.

In addition, since an abnormality determination unit that diagnoses a fire precursor or a fire outbreak by comparing collected data transmitted from a temperature sensor, an imaging unit, or both the temperature sensor and the imaging unit with a prestored reference value uses artificial intelligence, a fast processing speed and high accuracy can be provided.

In addition, in the present invention, one or more imaging units are provided, and when collected data captured by any one of the imaging units is diagnosed as a fire precursor or a fire outbreak, after another imaging unit is moved to a position at which a corresponding area may be photographed, the captured collected data is cross-verified, thereby improving the accuracy of verification.

The present invention has been described above with specific details such as specific components and limited embodiments and drawings, but this is only provided to facilitate a more general understanding of the present invention, and the present invention is not limited to the above embodiments. A person skilled in the art to which the present invention pertains may make various modifications and changes based on this description.

Therefore, the spirit of the present invention should not be limited to the above-described embodiments, and the following claims as well as any modifications equal or equivalent to the claims are intended to fall within the scope and spirit of the present invention.

What is claimed is:

1. A battery pack fire detection system for an electric mobility for detecting overheating and a temperature abnormality of a battery pack installed in an electric mobility, the battery pack fire detection system comprising:

a temperature sensor (10) installed inside or outside the battery pack to measure an internal temperature of the battery pack;

one or more imaging units (20) installed to photograph an exterior of the battery pack;

an abnormality determination unit (30) configured to receive collected data collected through the temperature sensor (10) and the imaging units (20) and compare the collected data with a prestored reference value to detect whether the battery pack is abnormal;

a storage unit (40) configured to receive and store the collected data collected through the temperature sensor (10) and the imaging units (20) and a detection result of the abnormality determination unit (30);

a transmission unit (50) configured to, when it is identified that the battery pack is abnormal as the detection result of the abnormality determination unit (30), transmit an alarm regarding an abnormality or normality and a captured video and image to a prestored user terminal, control center, and emergency rescue organization and transmit an abnormality signal to a control panel of the electric mobility, wherein the abnormality determination unit (30) receives the collected data from the one or more imaging units (20) installed to photograph the exterior or an interior of the electric mobility and compares the collected data with the prestored reference value to detect whether a fire has occurred, when it is determined that a calculated value obtained by comparing the collected data collected through any one imaging unit (20) of the one or more imaging units (20) or the temperature sensor (10) with the prestored reference value indicates a fire precursor, the abnormality determination unit (30) moves other imaging units (20) other than the imaging unit (20) to a position at which an area in which the fire precursor is determined is to be photographed, through a displacement module (60), and receives videos or images captured by the moved imaging units (20) to perform cross-verification on the fire precursor of the area, and when an analysis result of the abnormality determination unit (30) indicates a fire precursor or a fire outbreak, a general camera is used to photograph an actual situation of a corresponding area, and the transmission unit (50) transmits a video or an image captured by the general camera to the user terminal, the control center, and the emergency rescue organization to allow the actual situation to be identified.

2. The battery pack fire detection system of claim 1, wherein the temperature sensor (10) is provided as one or more temperature sensors (10) installed at positions spaced apart from each other to detect temperatures of different areas or different components inside the battery pack.

3. The battery pack fire detection system of claim 1, wherein the displacement module (60) includes:

a winding unit (61) in which pairs of winding rollers (611) are disposed to be spaced apart from each other at two sides, wherein the pair of winding rollers (611) are disposed at two sides to face each other;

a pair of wires (62) which extend in a longitudinal direction and of which one end portions in the longitudinal direction are each drawn out and wound from and on the pair of winding rollers (611) facing each other;

a motor (63) configured to move the pair of wires (62) in the same direction by rotating the pair of winding rollers (611);

a moving plate (64) to which the one end portions of the wire (62) are fixed and on which the imaging unit (20) is installed; and a rail (65) which extends in a longitudinal direction, is disposed between the winding rollers (611) disposed at the two sides of the winding unit (61), and guides a movement path of the moving plate (64).

* * * * *